(12) United States Patent
Pei et al.

(10) Patent No.: US 10,481,266 B2
(45) Date of Patent: Nov. 19, 2019

(54) MULTI-RANGE THREE-DIMENSIONAL IMAGING SYSTEMS

(71) Applicant: Cepton Technologies, Inc., San Jose, CA (US)

(72) Inventors: Jun Pei, Saratoga, CA (US); Mark A. McCord, Los Gatos, CA (US); June Ye, Palo Alto, CA (US)

(73) Assignee: Cepton Technologies, Inc., San Jose, CA (US)

( * ) Notice: Subject to any disclaimer, the term of this patent is extended or adjusted under 35 U.S.C. 154(b) by 480 days.

(21) Appl. No.: 15/288,206

(22) Filed: Oct. 7, 2016

(65) Prior Publication Data

US 2017/0307759 A1 Oct. 26, 2017

Related U.S. Application Data

(60) Provisional application No. 62/327,447, filed on Apr. 26, 2016.

(51) Int. Cl.
*G01S 17/00* (2006.01)
*G01S 17/89* (2006.01)
(Continued)

(52) U.S. Cl.
CPC ............. *G01S 17/89* (2013.01); *B60R 1/00* (2013.01); *B60R 11/04* (2013.01); *G01S 7/484* (2013.01);
(Continued)

(58) Field of Classification Search
USPC ........................................................ 356/5.01
See application file for complete search history.

(56) References Cited

U.S. PATENT DOCUMENTS

| 6,556,282 B2 * | 4/2003 | Jamieson | ............. | G01C 23/005 |
| | | | | 356/141.1 |
| 7,095,488 B2 * | 8/2006 | Jamieson | ............. | G01S 7/4811 |
| | | | | 356/141.1 |

(Continued)

FOREIGN PATENT DOCUMENTS

WO WO 2014/060562 A1 4/2014

OTHER PUBLICATIONS

Notification of Transmittal of the International Search Report and the Written Opinion of the International Searching Authority, or the Declaration for corresponding International Patent Application No. PCT/US2017/025785 dated Aug. 16, 2017, 16 pages.
(Continued)

*Primary Examiner* — James R Hulka
(74) *Attorney, Agent, or Firm* — Kilpatrick Townsend & Stockton LLP

(57) ABSTRACT

A three-dimensional imaging system includes a lidar sensor having a first optical axis oriented at a first angle toward a scene and configured to determine a three-dimensional image of one or more first objects in the scene, and an optical three-dimensional sensor having a second optical axis oriented at a second angle toward the scene and configured to construct a three-dimensional image of one or more second objects in the scene. The first three-dimensional sensor is characterized by a first angular field of view. The second three-dimensional sensor is characterized by a second angular field of view different from the first angular field of view.

21 Claims, 8 Drawing Sheets

(51) Int. Cl.

| | |
|---|---|
| *H04N 13/254* | (2018.01) |
| *G01S 7/484* | (2006.01) |
| *G01S 7/486* | (2006.01) |
| *G06T 7/70* | (2017.01) |
| *B60R 1/00* | (2006.01) |
| *B60R 11/04* | (2006.01) |
| *G06K 9/00* | (2006.01) |
| *G01S 7/481* | (2006.01) |
| *G01S 17/42* | (2006.01) |
| *G01S 17/10* | (2006.01) |
| *G01S 17/87* | (2006.01) |
| *G01S 17/93* | (2006.01) |
| *G01S 7/497* | (2006.01) |
| *G06T 7/521* | (2017.01) |
| *H04N 13/239* | (2018.01) |
| *B60R 11/00* | (2006.01) |

(52) U.S. Cl.
CPC ........... *G01S 7/4811* (2013.01); *G01S 7/4815* (2013.01); *G01S 7/4816* (2013.01); *G01S 7/4817* (2013.01); *G01S 7/4865* (2013.01); *G01S 7/4868* (2013.01); *G01S 7/4972* (2013.01); *G01S 17/10* (2013.01); *G01S 17/42* (2013.01); *G01S 17/87* (2013.01); *G01S 17/936* (2013.01); *G06K 9/00805* (2013.01); *G06T 7/521* (2017.01); *G06T 7/70* (2017.01); *H04N 13/239* (2018.05); *H04N 13/254* (2018.05); *B60R 2011/004* (2013.01); *B60R 2300/103* (2013.01); *B60R 2300/105* (2013.01); *B60R 2300/8093* (2013.01)

(56) References Cited

U.S. PATENT DOCUMENTS

| | | | | |
|---|---|---|---|---|
| 7,933,002 | B2* | 4/2011 | Halldorsson | G01P 5/26 356/28 |
| 8,085,388 | B2* | 12/2011 | Kaufman | G01B 11/2518 356/4.01 |
| 8,232,514 | B2* | 7/2012 | Grund | G01S 7/4813 250/214 R |
| 8,493,445 | B2* | 7/2013 | Degnan, III | G01S 17/89 348/117 |
| 8,494,687 | B2* | 7/2013 | Vanek | G01S 7/4808 356/4.01 |
| 8,558,993 | B2* | 10/2013 | Newbury | G01S 7/484 356/4.1 |
| 8,600,606 | B2* | 12/2013 | Nickolaou | B60W 30/0953 342/70 |
| 8,655,513 | B2* | 2/2014 | Vanek | G01S 17/58 356/4.01 |
| 8,736,818 | B2* | 5/2014 | Weimer | G01C 3/08 250/208.2 |
| 8,797,550 | B2* | 8/2014 | Hays | G01J 9/04 356/519 |
| 8,810,796 | B2* | 8/2014 | Hays | G01S 17/58 356/450 |
| 8,866,322 | B2* | 10/2014 | Tchoryk, Jr. | G01P 5/26 290/44 |
| 9,041,915 | B2* | 5/2015 | Earhart | G01S 3/7867 356/220 |
| 9,086,488 | B2* | 7/2015 | Tchoryk, Jr. | G01S 17/95 |
| 9,304,203 | B1* | 4/2016 | Droz | G01S 7/4808 |
| 9,609,858 | B2* | 4/2017 | Stowe | A01D 34/015 |
| 10,051,854 | B2* | 8/2018 | Stowe | A01D 34/015 |
| 10,218,962 | B2* | 2/2019 | Banks | G01S 7/4816 |
| 2003/0043363 | A1* | 3/2003 | Jamieson | G01C 23/005 356/5.01 |
| 2004/0141170 | A1 | 7/2004 | Jamieson et al. | |
| 2007/0279615 | A1* | 12/2007 | Degnan | G01S 7/499 356/4.01 |
| 2008/0246943 | A1 | 10/2008 | Kaufman et al. | |
| 2009/0310118 | A1* | 12/2009 | Halldorsson | G01P 5/26 356/28 |
| 2010/0102203 | A1* | 4/2010 | Grund | G01S 7/4813 250/207 |
| 2010/0328644 | A1* | 12/2010 | Lu | G01S 7/4802 356/5.01 |
| 2011/0181864 | A1* | 7/2011 | Schmitt | G01S 17/95 356/28 |
| 2011/0196568 | A1* | 8/2011 | Nickolaou | B60W 30/0953 701/31.4 |
| 2011/0224840 | A1* | 9/2011 | Vanek | G01S 17/58 701/1 |
| 2012/0033196 | A1* | 2/2012 | Vanek | G01S 7/4808 356/4.01 |
| 2012/0038903 | A1* | 2/2012 | Weimer | G01C 3/08 356/4.07 |
| 2012/0044476 | A1* | 2/2012 | Earhart | G01S 3/7867 356/4.01 |
| 2012/0050750 | A1* | 3/2012 | Hays | G01J 9/04 356/519 |
| 2012/0091324 | A1* | 4/2012 | Grund | G01S 7/4813 250/214 R |
| 2012/0169053 | A1* | 7/2012 | Tchoryk, Jr. | G01P 5/26 290/44 |
| 2012/0274937 | A1* | 11/2012 | Hays | G01S 17/58 356/337 |
| 2013/0314694 | A1* | 11/2013 | Tchoryk, Jr. | G01S 17/95 356/28.5 |
| 2015/0075066 | A1 | 3/2015 | Stowe et al. | |
| 2015/0296201 | A1 | 10/2015 | Banks | |

OTHER PUBLICATIONS

Invitation to Pay Additional Fees and, Where Applicable, Protest Fee and Partial Search Report for corresponding International Patent Application No. PCT/US2017/025785 dated Jun. 8, 2017, 2 pages.

* cited by examiner

MULTI-RANGE THREE-DIMENSIONAL IMAGING SYSTEMS

CROSS-REFERENCES TO RELATED APPLICATIONS

This application claims the benefit of U.S. Provisional Patent Application No. 62/327,447, filed on Apr. 26, 2016, the contents of which is incorporated by reference in its entirety. This application is related to U.S. patent application Ser. No. 15/267,558, filed on Sep. 16, 2016, the contents of which is incorporated by reference in its entirety.

BACKGROUND OF THE INVENTION

Three-dimensional sensors are important for autonomous vehicles, drones, and other applications. They may be used, for example, for obstacle detection in an autonomous or semi-autonomous vehicle. Long range radar has become a common option for high end automobiles due to its low cost and high reliability. While the angular resolution of a millimeter wave radar (e.g., operating at 72 GHz W band) could be better than 2 degrees, such angular resolution is insufficient to guide autonomous vehicles at high speed. For example, a 200 meter sensing range is usually considered to be necessary for cars travelling at 120 km per hour (i.e., about 33 m/s or 75 mph). It may be calculated that an angular resolution of 0.2 degrees or less is necessary to achieve a spatial resolution of 0.7 m for an object at 200 m away. This spatial resolution would ensure the detection of a normal sized vehicle with at least one pixel. On the other hand, current commercially available three-dimensional sensors based on lidars are very expensive compared to the average selling price of a consumer automobile.

SUMMARY OF THE INVENTION

The present invention relates generally to three-dimensional imaging systems. More specifically, the present invention relates to three-dimensional imaging systems that may include two or more scanning lidar sensors, or may include a lidar sensor combined with a different type of optical three-dimensional sensor. The three-dimensional imaging systems may be suitable for autonomous vehicles, drones and other applications.

According to an embodiment of the present invention, a system for performing three-dimensional imaging of a scene includes a first lidar sensor having a first optical axis oriented at a first angle toward the scene. The first lidar sensor includes a first laser source configured to emit a first plurality of laser pulses, and a first emission optical element configured to collimate and direct the first plurality of laser pulses at a first plurality of corresponding incidence angles with respect to the first optical axis toward one or more first objects in the scene. A portion of each of the first plurality of laser pulses may be reflected off of the one or more first objects. The first lidar sensor further includes a first receiving optical element configured to receive and focus the portion of each of the first plurality of laser pulses reflected off of the one or more first objects, and a first photodetector configured to receive and detect the portion of each of the first plurality of laser pulses focused by the first receiving optical element. The system further include a second lidar sensor having a second optical axis oriented at a second angle toward the scene. The second lidar sensor includes a second laser source configured to emit a second plurality of laser pulses, and a second emission optical element configured to collimate and direct the second plurality of laser pulses at a second plurality of corresponding incidence angles with respect to the second optical axis toward one or more second objects in the scene. A portion of each of the second plurality of laser pulses may be reflected off of the one or more second objects. The second lidar sensor further includes a second receiving optical element configured to receive and focus the portion of each of the second plurality of laser pulses reflected off of the one or more second objects, and a second photodetector configured to receive and detect the portion of each of the second plurality of laser pulses focused by the second receiving optical element. The system further includes a processor including one or more processing units coupled to the first lidar sensor and the second lidar sensor. The processor may be configured to determine a time of flight for each of the first plurality of laser pulses and each of the second plurality of laser pulses from emission to detection, and construct a three dimensional image of the scene based on the determined time of flight for each of the first plurality of laser pulses and each of the second plurality of laser pulses, the first angle of the first optical axis, the first plurality of incidence angles, the second angle of the second optical axis, and the second plurality of incidence angles.

According to another embodiment of the present invention, a three-dimensional imaging system includes a first three-dimensional sensor having a first optical axis oriented at a first angle toward a scene. The first three-dimensional sensor includes a laser source configured to emit a plurality of laser pulses, and an emission optical element configured to collimate and direct the plurality of laser pulses at a plurality of corresponding incidence angles with respect to the first optical axis toward one or more first objects in the scene. A portion of each of the plurality of laser pulses may be reflected off of the one or more first objects. The first three-dimensional sensor further includes a receiving optical element configured to receive and focus the portion of each of the plurality of laser pulses reflected off of the one or more first objects, a photodetector configured to receive and detect the portion of each of the plurality of laser pulses focused by the receiving optical element, and a processor including one or more processing units coupled to the laser source and the photodetector. The processor is configured to determine a time of flight for each of the plurality of laser pulses, and construct a three dimensional image of the one or more first objects based on the determined time of flight for each of the plurality of laser pulses, the first angle of the first optical axis, and the plurality of incidence angles. The first three-dimensional sensor is characterized by a first angular field of view. The three-dimensional imaging system further includes a second three-dimensional sensor configured to construct a three-dimensional image of one or more second objects in the scene, the second three-dimensional sensor characterized by a second angular field of view. The processor is coupled to the second three-dimensional sensor and configured to construct a three-dimensional image of the scene based on the three-dimensional image of the one or more first objects and the three-dimensional image of the one or more second objects.

According to a further embodiment of the present invention, a method of three-dimensional sensing for an autonomous vehicle includes sensing one or more first objects in a forward direction using a lidar sensor including a laser source, a photodetector, an emission optical element, a receiving optical element, and a processor including one or more processing units coupled to the laser source and the photodetector. Sensing the one or more first objects is performed by: emitting, using the laser source, a plurality of laser pulses, and collimating and directing, using the emission optical element, the plurality of laser pulses at a plurality of corresponding incidence angles with respect to the forward direction toward the one or more first objects. A portion of each of the plurality of laser pulses may be reflected off of the one or more first objects. Sensing the one or more first objects is further performed by receiving and focusing, using the receiving optical element, the portion of each of the plurality of laser pulses reflected off of the one or more first objects, detecting, using the photodetector, the portion of each of the plurality of laser pulses focused by the receiving optical element, determining, using the processor, a time of flight for each of the plurality of laser pulses from emission to detection, and constructing, using the processor, a three dimensional image of the one or more first objects based on the determined time of flight for each of the plurality of laser pulses and the plurality of incidence angles. The method further includes sensing one or more second objects in a direction to the left or right using an optical three-dimensional sensor to obtain a three-dimensional image of the one or more second objects, and combining, using the processor, the three dimensional image of the one or more first objects and the three-dimensional image of the one or more second objects.

These and other embodiments of the invention along with many of its advantages and features are described in more detail in conjunction with the text below and attached figures.

DETAILED DESCRIPTION OF SPECIFIC EMBODIMENTS

The present invention relates generally to systems and methods for three-dimensional imaging. More specifically, the present invention relates to a three-dimensional imaging system that includes a scanning lidar sensor and another optical three-dimensional sensor. The lidar sensor and the optical three-dimensional sensor may have different sensing ranges and different angular fields of view. The systems and methods of three-dimensional imaging may be suitable for autonomous vehicles, drones and other applications.

Figure 1:
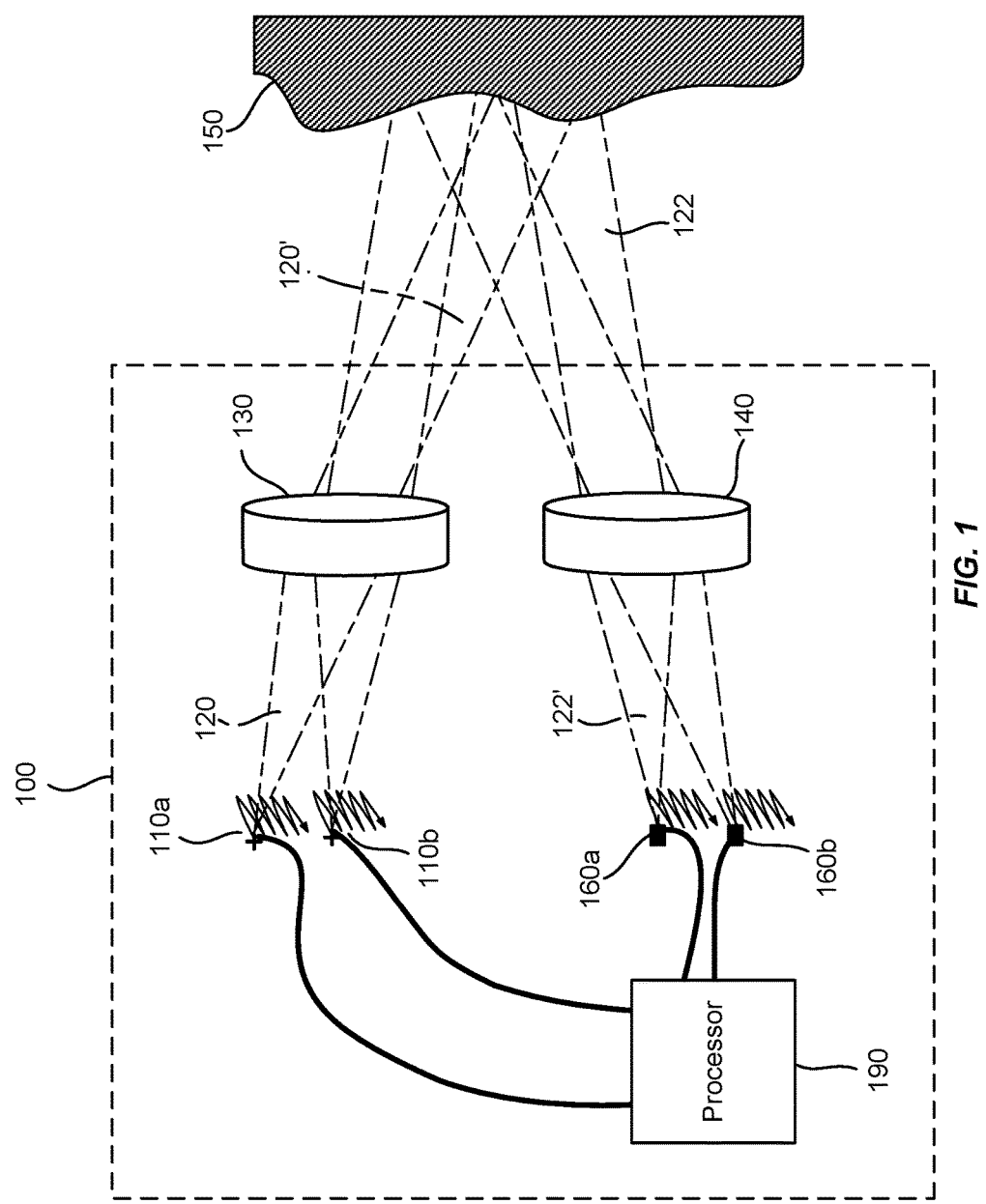
FIG. 1 illustrates schematically a lidar sensor for three-dimensional imaging according to an embodiment of the present invention.

FIG. 1 illustrates schematically a lidar sensor 100 for three-dimensional imaging according to an embodiment of the present invention. The lidar sensor 100 includes an emitting lens 130 and a receiving lens 140, both being fixed. The lidar sensor 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the lidar sensor 100. For a given emission location of the laser source 110a, the collimated laser pulse 120' is directed at a corresponding angle toward the object 150.

A portion 122 of the laser pulse 120 is reflected off of the object 150 toward the receiving lens 140. The receiving lens 140 is configured to focus the portion 122 of the laser pulse 120 reflected off of the object 150 onto a corresponding detection location in the focal plane of the receiving lens 140. The lidar sensor 100 further includes a photodetector 160a disposed substantially at the focal plane of the receiving lens 140. The photodetector 160a is configured to receive and detect the portion 122 of the laser pulse 120 reflected off of the object at the corresponding detection location. The corresponding detection location of the photodetector 160a is conjugate with the respective emission location of the laser source 110a.

The laser pulse 120 may be of a short duration, for example, 100 ns pulse width. The lidar sensor 100 further includes a processor 190 coupled to the laser source 110a and the photodetector 160a. The processor 190 is configured to determine a time of flight (TOF) of the laser pulse 120 from emission to detection. Since the laser pulse 120 travels at the speed of light, a distance between the lidar sensor 100 and the object 150 may be determined based on the determined time of flight.

According to some embodiments, the laser source 120a may be raster scanned to a plurality of emission locations in the back focal plane of the emitting lens 130, and is configured to emit a plurality of laser pulses at the plurality of emission locations. Each laser pulse emitted at a respective emission location is collimated by the emitting lens 130 and directed at a respective angle toward the object 150, and incidents at a corresponding point on the surface of the object 150. Thus, as the laser source 120a is raster scanned within a certain area in the back focal plane of the emitting lens 130, a corresponding object area on the object 150 is scanned. The photodetector 160a is raster scanned to a plurality of corresponding detection locations in the focal plane of the receiving lens 140. The scanning of the photodetector 160a is performed synchronously with the scanning of the laser source 110a, so that the photodetector 160a and the laser source 110a are always conjugate with each other at any given time.

By determining the time of flight for each laser pulse emitted at a respective emission location, the distance from the lidar sensor 100 to each corresponding point on the surface of the object 150 may be determined. In some embodiments, the processor 190 is coupled with a position encoder that detects the position of the laser source 110a at each emission location. Based on the emission location, the angle of the collimated laser pulse 120' may be determined. The X-Y coordinate of the corresponding point on the surface of the object 150 may be determined based on the angle and the distance to the lidar sensor 100. Thus, a three-dimensional image of the object 150 may be constructed based on the measured distances from the lidar sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the lidar sensor 100 may be estimated based on the scanning range of the laser source 110a and the focal length of the emitting lens 130 as, $$AFOV = 2 \tan^{-1}\left(\frac{h}{2f}\right),$$

where h is scan range of the laser source 110a along certain direction, and f is the focal length of the emitting lens 130. For a given scan range h, shorter focal lengths would produce wider AFOVs. For a given focal length f, larger scan ranges would produce wider AFOVs. In some embodiments, the lidar sensor 100 may include multiple laser sources disposed as an array at the back focal plane of the emitting lens 130, so that a larger total AFOV may be achieved while keeping the scan range of each individual laser source relatively small. Accordingly, the lidar sensor 100 may include multiple photodetectors disposed as an array at the focal plane of the receiving lens 140, each photodetector being conjugate with a respective laser source. For example, the lidar sensor 100 may include a second laser source 110b and a second photodetector 160b, as illustrated in FIG. 1. In other embodiments, the lidar sensor 100 may include four laser sources and four photodetectors, or eight laser sources and eight photodetectors. In one embodiment, the lidar sensor 100 may include 8 laser sources arranged as a 4×2 array and 8 photodetectors arranged as a 4×2 array, so that the lidar sensor 100 may have a wider AFOV in the horizontal direction than its AFOV in the vertical direction. According to various embodiments, the total AFOV of the lidar sensor 100 may range from about 5 degrees to about 15 degrees, or from about 15 degrees to about 45 degrees, or from about 45 degrees to about 90 degrees, depending on the focal length of the emitting lens, the scan range of each laser source, and the number of laser sources.

The laser source 110a may be configured to emit laser pulses in the ultraviolet, visible, or near infrared wavelength ranges. The energy of each laser pulse may be in the order of microjoules, which is normally considered to be "eye-safe." For laser sources operating in wavelengths greater than about 1500 nm, the energy levels could be higher as the eye does not focus at those wavelengths. The photodetector 160a may comprise a silicon avalanche photodiode, a photomultiplier, a PIN diode, or other semiconductor sensors.

The angular resolution of the lidar sensor 100 can be effectively diffraction limited, which may be estimated as, $$\theta = 1.22 \ \lambda/D,$$

where λ is the wavelength of the laser pulse, and D is the diameter of the lens aperture. According to various embodiments, the angular resolution of the lidar sensor 100 may range from about 1 mrad to about 20 mrad (about 0.05-1.0 degrees), depending on the type of lenses.

In some embodiments, the laser sources and the photodetectors may be scanned using relatively low-cost flexure mechanisms, as described below.

Figure 2:
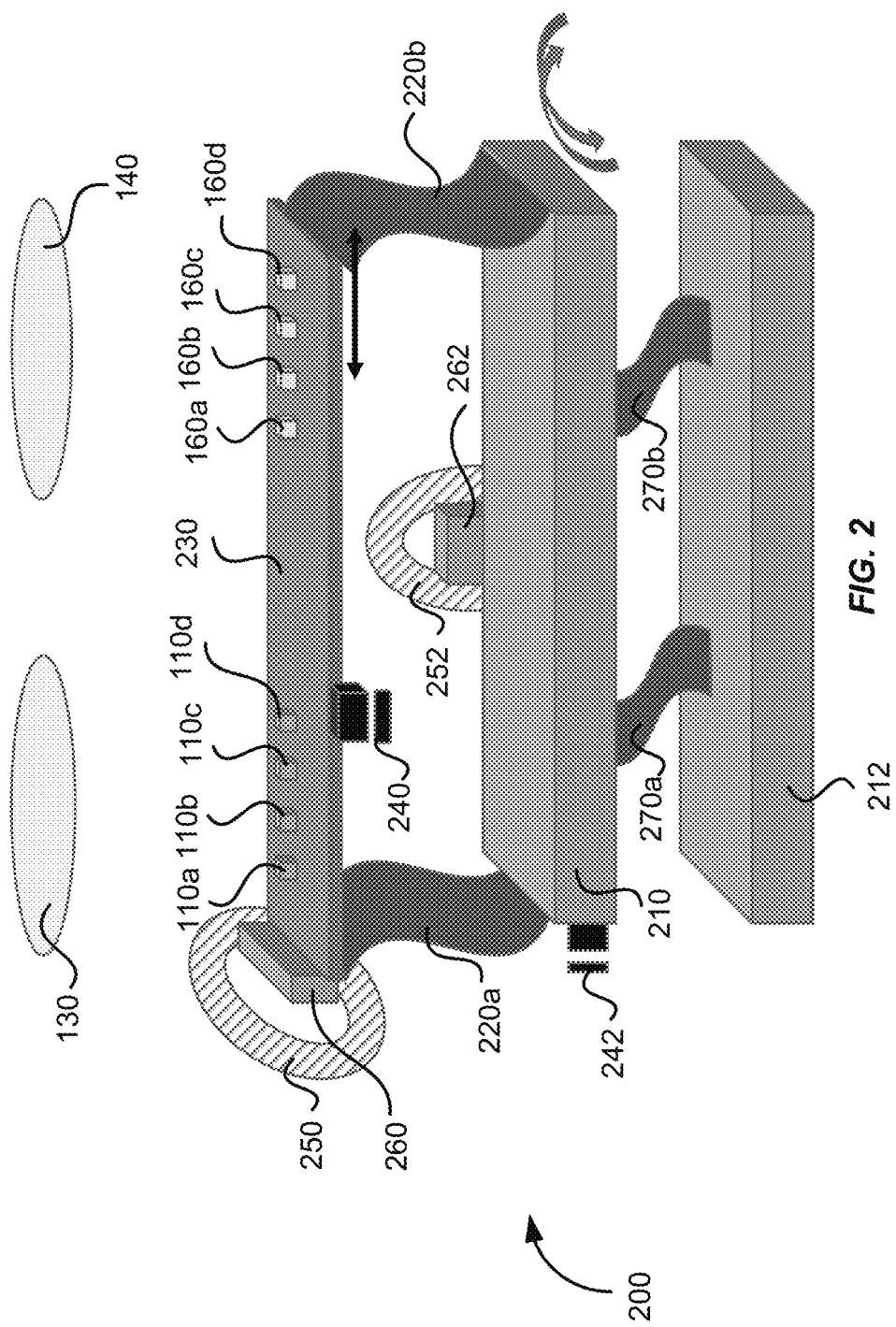
FIG. 2 illustrates schematically a flexure mechanism for scanning one or more laser sources and one or more photodetectors in a lidar sensor according to an embodiment of the present invention.

FIG. 2 illustrates schematically a flexure mechanism 200 that may be used for scanning one or more laser sources 110a-110d and one or more photodetectors 160a-160d in the lidar sensor 100 illustrated in FIG. 1, according to another embodiment of the present invention. In this example, four laser sources 110a-110d and four photodetectors 160a-160d are mounted on a same rigid platform 230. The positions of the laser sources 110a-110d and the photodetectors 160a-160d are arranged such that each laser source 110a, 110b, 110c, or 110d is spatially conjugate with a corresponding photodetector 160a, 160b, 160c, or 160d. The platform 230 is coupled to a first base plate 210 by a first flexure comprising two flexure elements 220a and 220b. The flexure elements 220a and 220b may be deflected to the left or right by using a single actuator, such as the voice coil 250 and permanent magnet 260 as shown in FIG. 2, or by a piezoelectric actuator, and the like. In one embodiment, the first base plate 210 may be coupled to a second base plate 212 by a second flexure comprising two flexure elements 270a and 270b. The flexure elements 270a and 270b may be deflected forward or backward by using a single actuator, such as the voice coil 252 and the permanent magnet 262 as shown in FIG. 2, or by a piezoelectric actuator, and the like.

Thus, the laser sources 110a-110d and the photodetectors 160a-160d may be scanned in two dimensions in the focal planes of the emitting lens 130 and the receiving lens 140, respectively, by the left-right movements of the flexure elements 220a and 220b, and by the forward-backward movements of the flexure elements 270a and 270b. Because the laser sources 110a-110d and the photodetectors 160a-160d are mounted on the same rigid platform 230, the conjugate spatial relationship between each laser-photodetector pair is maintained as they are scanned, provided that the lens prescriptions for the emitting lens 130 and the receiving lens 140 are essentially identical. It should be appreciated that, although four laser sources 110a-110d and four photodetectors 160a-160d are shown as an example in FIG. 2, fewer or more laser sources and fewer or more photodetectors may be mounted on a single platform 230. For example, one laser source and one photodetector, or two laser sources and two photodetectors, or eight laser sources and eight photodetectors may be mounted on a single platform 230, according to various embodiments of the present invention. In one embodiment, eight laser sources may be arranged as a 4×2 array, and eight photodetectors may be arranged as a 4×2 array, all mounted on the same rigid platform 230.

In some embodiments, a first position encoder 240 may be disposed adjacent the platform 230 for detecting coordinates of the laser sources 110a-110d in the left-right direction (i.e., the x-coordinates), and a second position encoder 242 may be disposed adjacent the first base plate 210 for detecting coordinates of the laser sources 110a-110d in the forward-backward direction (i.e., the y-coordinates). The first position encoder 240 and the second position encoder 242 may input the x-y coordinates of the laser sources 110a-110d to the processor 190 to be used for constructing the three-dimensional image of the object 150.

In other embodiments, other types of flexure mechanisms may be used in a scanning lidar sensor. Additional description related to a scanning lidar sensor is provided in U.S. patent application Ser. No. 15/267,558, filed on Sep. 16, 2016, the disclosure of which is hereby incorporated by reference in its entirety for all purposes. In some embodiments, instead of using refractive lenses for collimating and focusing the laser pulses, reflective lenses or mirrors may be used for collimating and focusing the laser pulses. One of ordinary skill in the art would recognize many variations, alternatives, and modifications.

Figure 3:
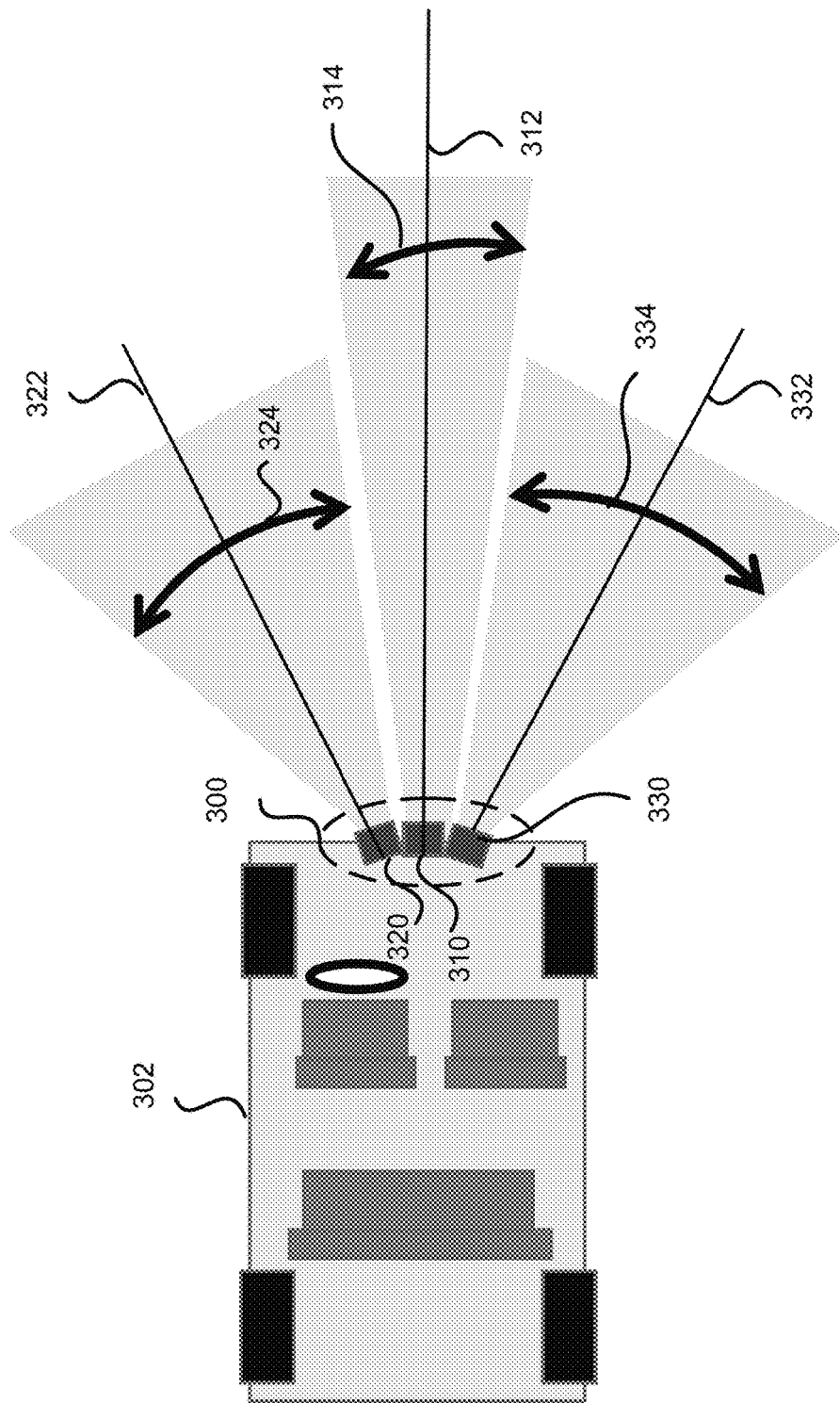
FIG. 3 illustrates schematically a three-dimensional imaging system that includes three lidar sensors according to an embodiment of the present invention.

FIG. 3 illustrates schematically a three-dimensional imaging system 300 that includes three lidar sensors according to an embodiment of the present invention. The three-dimensional imaging system 300 may be applicable for obstacle detection in an autonomous or semi-autonomous vehicle, and other applications. For example, the three-dimensional imaging system 300 may be mounted on or near a front bumper of a car 302, as illustrated in FIG. 3. The three-dimensional imaging system 300 may also be mounted on or near a rear bumper of the car 302, or on top of the car 302.

The three-dimensional imaging system 300 includes a first lidar sensor 310 with a first optical axis 312 oriented substantially in a forward direction, a second lidar sensor 320 with a second optical axis 322 oriented to the left, and a third lidar sensor 330 with a third optical axis 332 oriented to the right. In one embodiment, each of the first lidar sensor 310, the second lidar sensor 320, and the third lidar sensor 330 may be similar to the lidar sensor 100 illustrated in FIG. 1. In other embodiments, one or more the first lidar sensor 310, the second lidar sensor 320, and the third lidar sensor 330 may comprise a lidar sensor constructed differently from the lidar sensor 100 illustrated in FIG. 1. For example, one or more of the first lidar sensor 310, the second lidar sensor 320, and the third lidar sensor 330 may comprise a lidar sensor that uses a collimating mirror and a focusing mirror, instead of the collimating lens 130 and the focusing lens 140.

The first lidar sensor 310 may be characterized by a first angular field of view 314 in the forward direction. The second lidar sensor 320 may be characterized by a second angular field of view 324 to the left. The third lidar sensor 330 may be characterized by a third angular field of view 334 to the right. In one embodiment, the three-dimensional imaging system 300 is configures such that the first angular field of view 314, the second angular field of view 324, and the third angular field of view 334 do not mutually overlap, as illustrated in FIG. 3.

In cases where the three-dimensional imaging system 300 is used for obstacle detection in autonomous vehicles, it may be desirable to have a longer sensing range along the direction where the vehicle is traveling than in other directions, such as to the left and to the right. The laser power of a lidar sensor may be limited to eye-safe levels. For a given laser power, the laser power density at a distance L away from the lidar sensor may be approximately proportional to inverse square of L and to inverse square of angular field of view. Therefore, the lidar sensor may be configured to have a longer sensing range at the expense of a narrower angular field of view. Conversely, a lidar sensor may be configured to have a wider angular field of view at the expense of a shorter sensing range.

It may be advantageous to configure the three-dimensional imaging system 300 such that the first lidar sensor 310 oriented in the forward direction has a longer sensing range and a narrower angular field of view, and the second lidar sensor 320 and the third lidar sensor 330 oriented to the left and right, respectively, have a shorter sensing range but wider angular fields of view, as illustrated in FIG. 3. In some embodiments, the first angular field of view 314 may range from about 5 degrees to about 30 degrees, and each of the second angular field of view 324 and the third angular field of view 334 may range from about 40 degrees to about 90 degrees. In one embodiment, the first lidar sensor 310, the second lidar sensor 320, and the third lidar sensor 330 may give rise to a combined angular field of view ranging from about 110 degrees to about 180 degrees.

As discussed above, the angular field of view of a lidar sensor may depend on the lateral scanning range of the laser source and the focal length of the collimating lens. For a given scan range, a longer focal length lens may result in a narrower angular field of view; conversely, a shorter focal length lens may result in a wider angular field of view. In one embodiment, the first lidar sensor 310 may include an emission lens with a longer focal length, and each of the second lidar sensor 320 and the third lidar sensor 330 may include an emission lens with a shorter focal length.

Figure 4:
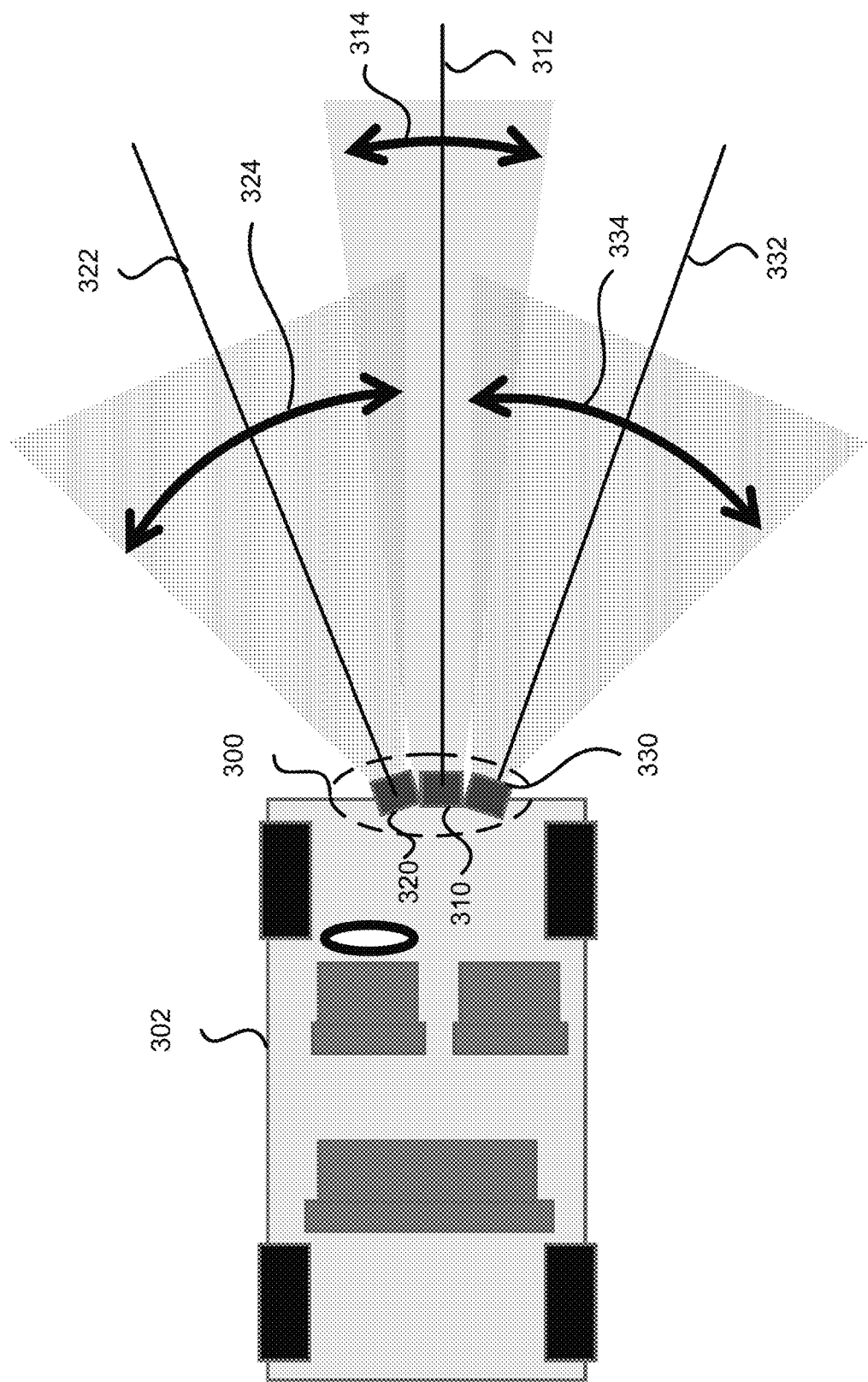
FIG. 4 illustrates schematically a three-dimensional imaging system that includes three lidar sensors according to another embodiment of the present invention.

FIG. 4 illustrates schematically a three-dimensional imaging system 300 that includes three lidar sensors 310, 320, and 330, according to another embodiment of the present invention. The arrangement of the three lidar sensors 310, 320, and 330 are similar to that illustrated in FIG. 3, except that the first angular field of view 314 of the first lidar sensor 310 partially overlaps with the second angular field of view 324 of the second lidar sensor 320, and also partially overlaps with the third angular field of view 334 of the third lidar sensor 330. In some embodiments, the three-dimensional imaging system 300 may use the overlapping angular field of view for cross-calibrations between the first lidar sensor 310 and the second lidar sensor 320, and between the first lidar sensor 310 and the third lidar sensor 330, as discussed below. The overlapping angular field of view can also be used to provide redundant information to the processor, thereby increasing the reliability of the imaging system 300 in critical applications such as collision avoidance in autonomous vehicles.

In some embodiments, the three lidar sensors 310, 320, and 330 may utilize laser sources that operate at different wavelengths to avoid interference between the three lidar sensors. In one embodiment, the laser sources for the three lidar sensors 310, 320, and 330 may be configured to emit laser pulses at regular time intervals at certain repetition rate, such as 10 kHz or the like. In one embodiment, the laser sources for the three lidar sensors 310, 320, and 330 may be configured to emit laser pulses simultaneously at same time intervals. In another embodiment, the laser sources for the three lidar sensors 310, 320, and 330 may be configured to emit laser pulses at staggered time intervals to prevent interference between the three lidar sensors. For example, the laser source for the first lidar sensor 310 may be configured to emit laser pulses at a pulse repetition rate of 10 kHz, which corresponds to a time interval between consecutive pulses $\Delta T=100$ μs. The laser source for the second lidar sensor 320 may be configured to emit laser pulses also at the pulse repetition rate of 10 kHz, but is staggered with respect to that of the laser source for the first lidar sensor 310 with a time delay $\Delta t$ that is less than the time interval $\Delta T$ between consecutive pulses. For example, the delay time between firing of the laser source for the second lidar sensor 320 and the firing of the laser source for the first lidar sensor 310 may be Δt=10 μs. Similarly, the laser source for the third lidar sensor 330 may be configured to emit laser pulses also at the pulse repetition rate of 10 kHz, but is staggered with respect to that of the laser source for the second lidar sensor 320 with another time delay Δt, such as Δt=10 μs.

Figure 5:
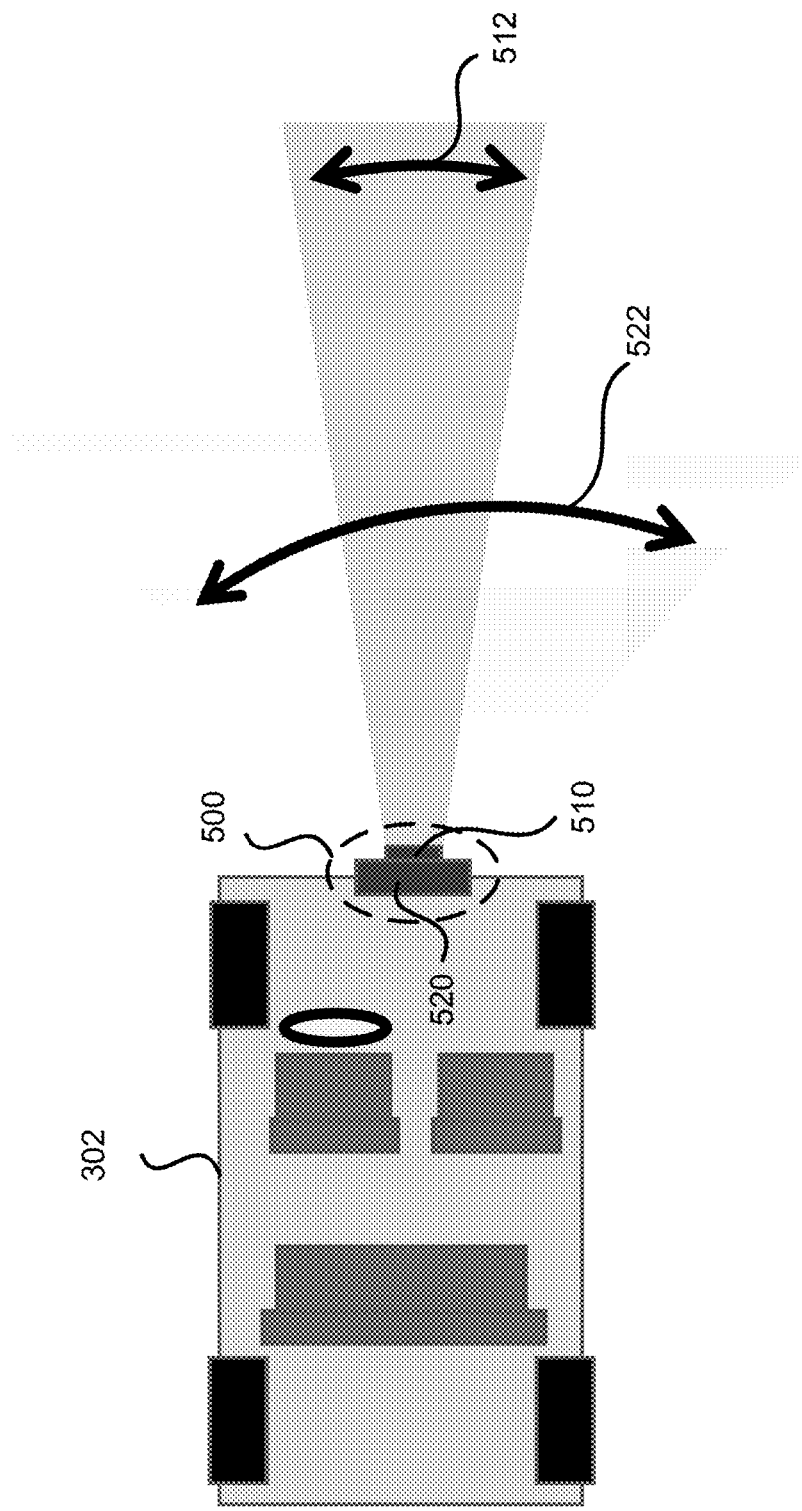
FIG. 5 illustrates schematically a three-dimensional imaging system that includes two three-dimensional sensors according to an embodiment of the present invention.

FIG. 5 illustrates schematically a three-dimensional imaging system 500 that includes a first three-dimensional sensor 510 and a second three-dimensional sensor 520 according to an embodiment of the present invention. The first three-dimensional sensor 510 has a first angular field of view 512, and the second three-dimensional sensor 520 has a second angular field of view 522 that is wider than and encompasses the first angular field of view 512. The first three-dimensional sensor 510 may be a lidar sensor substantially similar to the lidar sensor 100 illustrated in FIG. 1. In one embodiment, the second three-dimensional sensor 520 may also comprise a lidar sensor substantially similar to the lidar sensor 100 illustrated in FIG. 1. In other embodiments, the second three-dimensional sensor 520 may comprise a different type of optical three-dimensional sensor, such as a stereo camera, a structure light camera, an interferometry sensor, and the like. In yet other embodiments, the second three-dimensional sensor 520 may comprise an ultrasonic sensor, a radar sensor, and the like.

The three-dimensional imaging system 500 may be applicable for obstacle detection in an autonomous or semi-autonomous vehicle, and other applications. The three-dimensional imaging system 500 may be mounted on or near the front bumper of a vehicle, as illustrated in FIG. 5. In one embodiment, both the first three-dimensional sensor 510 and the second three-dimensional sensor 520 are aligned in the forward direction, as illustrated in FIG. 5. In some embodiments, the first three-dimensional sensor 510 may comprise a lidar sensor configured to have a first angular field of view 512 ranging from about 5 degrees to about 20 degrees, and may have a relatively long sensing range. The second three-dimensional sensor 520 may comprise a stereo camera or a structured light camera that have a second angular field of view 522 ranging from about 90 degrees to about 180 degrees, and may have a relatively short sensing range, as illustrated in FIG. 5. In some embodiments, the three-dimensional imaging system 500 may use the first three-dimensional sensor 510 to calibrate the second three-dimensional sensor 520, or vice versa, as discussed below.

Figure 6:
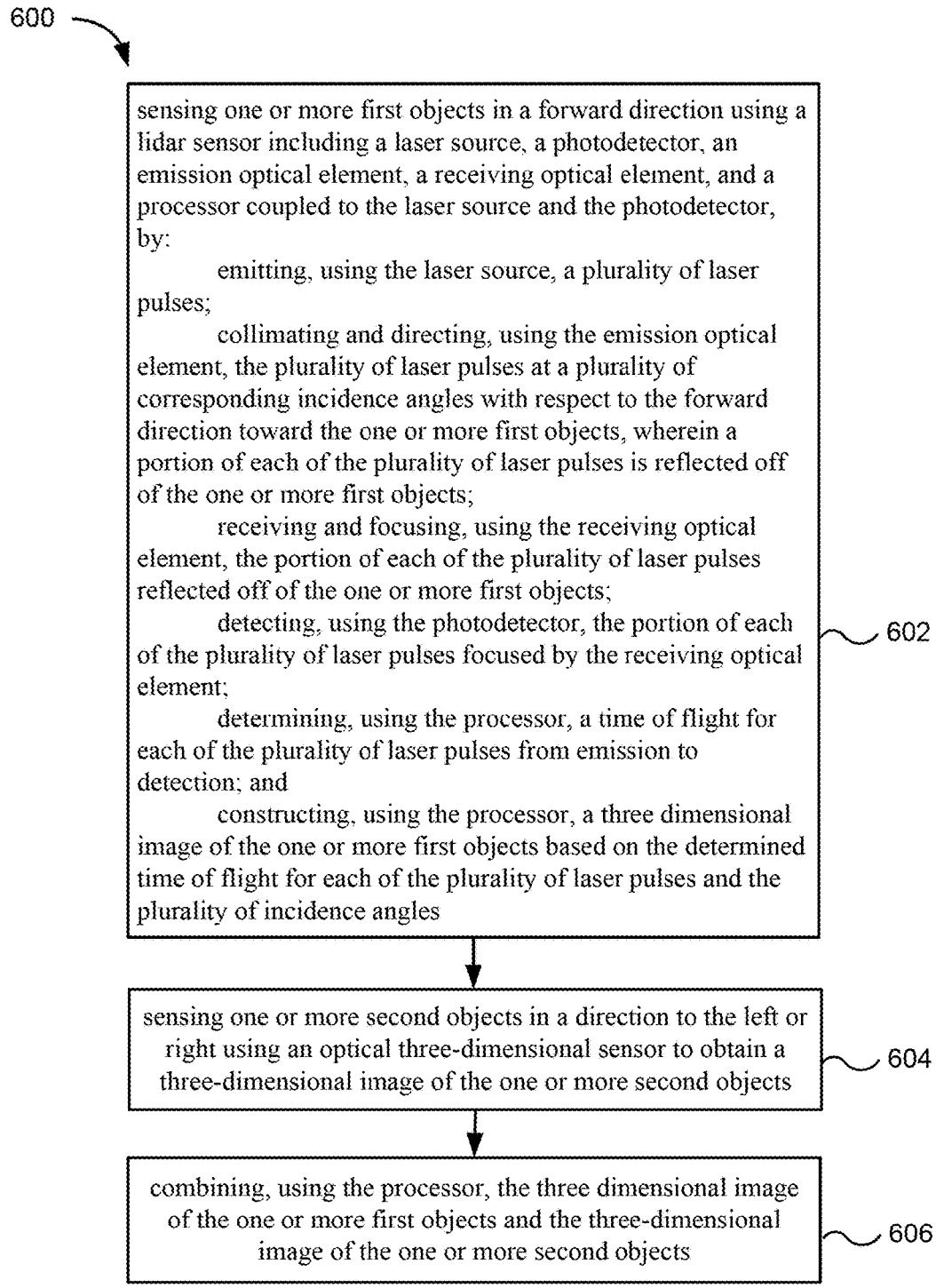
FIG. 6 shows a simplified flowchart illustrating a method of three-dimensional sensing according to an embodiment of the present invention.

FIG. 6 illustrates a method 600 of three-dimensional sensing for an autonomous vehicle according to an embodiment of the present invention. The method 600 includes, at 602, sensing one or more first objects in a forward direction using a lidar sensor that includes a laser source, a photodetector, an emission optical element, a receiving optical element, and a processor including one or more processing units coupled to the laser source and the photodetector. In one embodiment, sensing the one or more first objects may include: emitting, using the laser source, a plurality of laser pulses; collimating and directing, using the emission optical element, the plurality of laser pulses at a plurality of corresponding incidence angles with respect to the forward direction toward the one or more first objects, wherein a portion of each of the plurality of laser pulses is reflected off of the one or more first objects; receiving and focusing, using the receiving optical element, the portion of each of the plurality of laser pulses reflected off of the one or more first objects; detecting, using the photodetector, the portion of each of the plurality of laser pulses focused by the receiving optical element; determining, using the processor, a time of flight for each of the plurality of laser pulses from emission to detection; and constructing, using the processor, a three dimensional image of the one or more first objects based on the determined time of flight for each of the plurality of laser pulses and the plurality of incidence angles.

The method 600 further includes, at 604, sensing one or more second objects in a direction to the left or right using an optical three-dimensional sensor to obtain a three-dimensional image of the one or more second objects. In some embodiments, the lidar sensor has a first angular field of view, and the optical three-dimensional sensor has a second angular field of view wider than the first angular field of view. In one embodiment, the second angular field of view at least partially overlaps with the first angular field of view. In some embodiments, the lidar sensor has a first sensing range, and the optical three-dimensional sensor has a second sensing range less than the first sensing range. The method 600 may further include, at 608, combining, using the processor, the three dimensional image of the one or more first objects and the three-dimensional image of the one or more second objects.

It should be appreciated that the specific steps illustrated in FIG. 6 provide a particular method of performing three-dimensional imaging according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

Lower cost optical sensors may be expected to have lower performance specifications than optical sensors employing better quality components or technology. This may be true for a lidar three-dimensional sensor, as well as for other optical three-dimensional sensors. It may be possible to use a higher performance three-dimensional sensor to calibrate a lower performance three-dimensional sensor in certain configurations.

Figure 7:
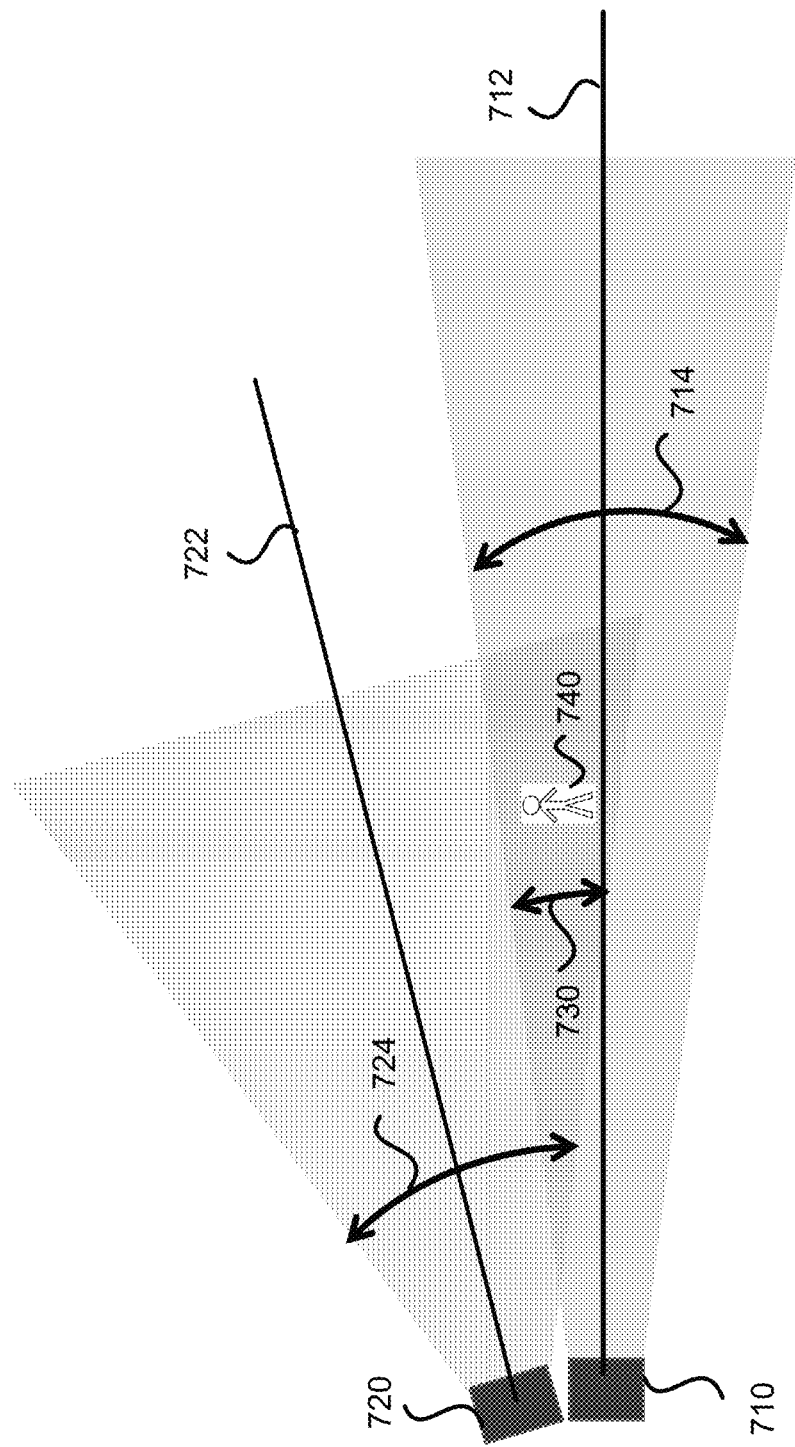
FIG. 7 illustrates schematically a three-dimensional imaging system where calibration may be performed according to an embodiment of the present invention.

FIG. 7 illustrates schematically a three-dimensional imaging system 700 where a calibration may be performed according to an embodiment of the present invention. The three-dimensional imaging system 700 includes a first three-dimensional sensor 710 with a first optical axis 712 oriented at a first angle, and a second three-dimensional sensor 720 with a second optical axis 722 oriented at a second angle. The first three-dimensional sensor 710 may be characterized by a first angular field of view 714, and the second three-dimensional sensor 720 may be characterized by a second angular field of view 724. The first angular field of view 714 overlaps with the second angular field of view 724 in an overlap angular field of view 730, as illustrated in FIG. 7. In this configuration, it may be possible to use the first three-dimensional sensor 710 to calibrate the second three-dimensional sensor 720, or vice versa, utilizing the overlap angular field of view 730. In one embodiment, the first three-dimensional sensor 710 may comprise a lidar sensor with a narrower angular field of view and a higher accuracy, and the second three-dimensional sensor 720 may comprise a lidar sensor with a wider angular field of view and a lower accuracy. In another embodiment, the first three-dimensional sensor 710 may comprise a lidar sensor, and the second three-dimensional sensor 720 may comprise an optical three-dimensional sensor of another type, such as a stereo camera, a structure light camera, or the like.

The calibration can take several forms. In one embodiment, it may involve a distance calibration with either a multiplication scale correction, an offset correction, or a combination of both. For a scale correction of distance, the corrected distance $d_c$ may be given by the measured distance $d_m$ multiplied by a constant $c_1$, as $d_c=c_1 \times d_m$. For an offset correction of distance, an offset $c_2$ may be added to or subtracted from the measured distance, as $d_c=d_m+c_2$. For a distance correction with both scaling and offsetting, the corrected distance $d_c$ may be given by $d_c=c_1 \times d_m+c_2$.

In another embodiment, it may involve an angular calibration, in either the horizontal direction or the vertical direction, or both. The angular calibration can be either a scale correction, or an offset correction, or a combination of both. For a scale correction of angle, the corrected angle $A_c$ may be given by the measured angle $A_m$ multiplied by a constant $c_3$, as $A_c=c_3 \times A_m$. For an offset correction of angle, an offset $c_4$ may be added to or subtracted from the measured angle, as $A_c=A_m+c_4$. For an angular correction with both scaling and offsetting, the corrected angle $A_c$ may be given by $A_c=c_3 \times A_m+c_4$.

In yet another embodiment, more complicated corrections, such as distortions, may be made. In some cases, a first three-dimensional sensor, such as a lidar sensor, may have better distance accuracy than a second optical three-dimensional sensor of a different type, while the second three-dimensional sensor may have better angular accuracy than the first three-dimensional sensor. In such cases, it may be possible to use the first three-dimensional sensor for distance calibration of the second sensor, and use the second three-dimensional sensor for angular calibration of the first three-dimensional sensor.

Figure 8:
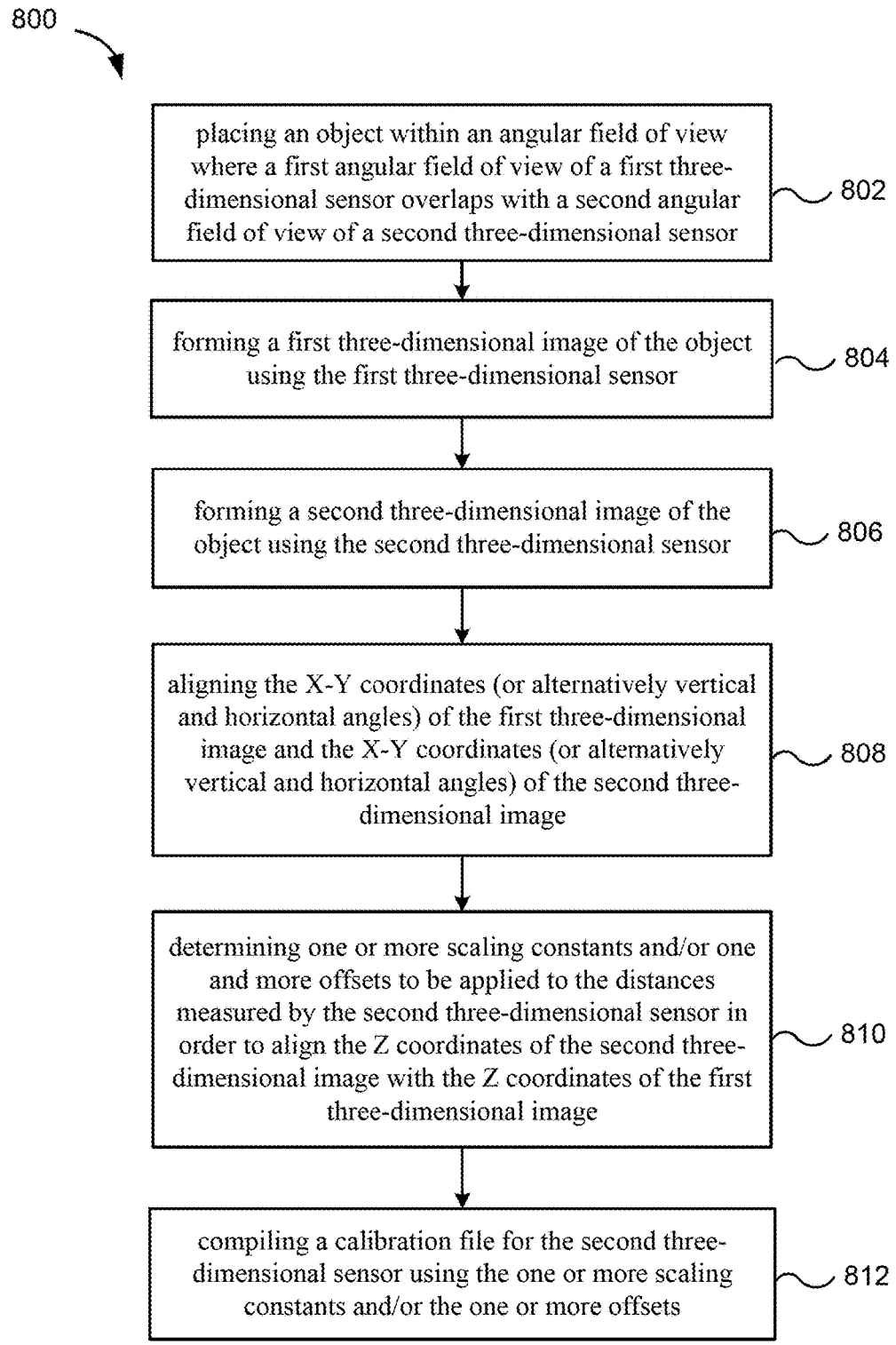
FIG. 8 shows a simplified flowchart illustrating a method of performing distance calibration according to an embodiment of the present invention.

FIG. 8 is a simplified flowchart illustrating a method 800 of performing distance calibration using the three-dimensional imaging system illustrated in FIG. 7, according to an embodiment of the present invention. In the method 800, it is assumed that the first three-dimensional sensor 710 has a higher accuracy than the second three-dimensional sensor 720, and is used to calibrate the second three-dimensional sensor 720. The method 800 includes, at 802, placing an object 740, such as a person, within the overlap angular field of view 730, as illustrated in FIG. 7. The method 800 further includes, at 804, forming a first three-dimensional image of the object 740 using the first three-dimensional sensor 710; and at 806, forming a second three-dimensional image of the object 740 using the second three-dimensional sensor 720.

The method 800 may further include, at 808, aligning the X-Y coordinates (or alternatively vertical and horizontal angles) of the first three-dimensional image and the X-Y coordinates (or alternatively vertical and horizontal angles) of the second three-dimensional image, using a suitable image processing algorithm. The method 800 further includes, at 810, determining one or more scaling constants and/or one and more offsets to be applied to the distances measured by the second three-dimensional sensor in order to align the Z coordinates of the second three-dimensional image with the Z coordinates of the first three-dimensional image. The method 800 may further include, at 812, compiling a calibration file for the second three-dimensional sensor 720 using the one or more scaling constants and/or the one or more offsets. The calibration file may be used for distance corrections for the second three-dimensional sensor 720 in future images. The method 800 may be adapted for angular calibration, distortion correction, and the like.

It should be appreciated that the specific steps illustrated in FIG. 8 provide a particular method of performing distance calibration in a three-dimensional imaging system according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for performing three-dimensional imaging of a scene, the system comprising:
 a first lidar sensor having a first optical axis oriented at a first angle toward the scene, the first lidar sensor including:
  a first laser source configured to emit a first plurality of laser pulses;
  a first emission lens configured to collimate and direct the first plurality of laser pulses at a first plurality of corresponding incidence angles with respect to the first optical axis toward one or more first objects in the scene, wherein the first emission lens has a first focal length so that the first plurality of corresponding incidence angles forms a first angular field of view, and wherein a portion of each of the first plurality of laser pulses is reflected off of the one or more first objects;
  a first receiving lens configured to receive and focus the portion of each of the first plurality of laser pulses reflected off of the one or more first objects; and
  a first photodetector configured to receive and detect the portion of each of the first plurality of laser pulses focused by the first receiving lens;
 a second lidar sensor having a second optical axis oriented at a second angle toward the scene, the second lidar sensor comprising:
  a second laser source configured to emit a second plurality of laser pulses;
  a second emission lens configured to collimate and direct the second plurality of laser pulses at a second plurality of corresponding incidence angles with respect to the second optical axis toward one or more second objects in the scene, wherein the second emission lens has a second focal length different from the first focal length so that the second plurality of corresponding incidence angles forms a second angular field of view different from the first angular field of view, and wherein a portion of each of the second plurality of laser pulses is reflected off of the one or more second objects;
a second receiving lens configured to receive and focus the portion of each of the second plurality of laser pulses reflected off of the one or more second objects; and
a second photodetector configured to receive and detect the portion of each of the second plurality of laser pulses focused by the second receiving lens; and
a processor including one or more processing units coupled to the first lidar sensor and the second lidar sensor, the processor configured to:
determine a time of flight for each of the first plurality of laser pulses and each of the second plurality of laser pulses from emission to detection; and
construct a three dimensional image of the scene based on the determined time of flight for each of the first plurality of laser pulses and each of the second plurality of laser pulses, the first angle of the first optical axis, the first plurality of incidence angles, the second angle of the second optical axis, and the second plurality of incidence angles.

2. The system of claim 1 wherein the second angular field of view is wider than the first angular field view.

3. The system of claim 2 wherein the first lidar sensor has a first sensing range, and the second lidar sensor has a second sensing range shorter than the first sensing range.

4. The system of claim 1 wherein the second angle of the second optical axis is different from the first angle of the first optical axis, and the first angular field of view does not overlap with the second angular field of view.

5. The system of claim 1 wherein the second angle of the second optical axis is different from the first angle of the first optical axis, and the first angular field of view partially overlaps with the second angular field of view.

6. The system of claim 1 wherein the second angular field of view encompasses the first angular field of view.

7. The system of claim 1 wherein:
the first laser source is configured to be translated through a first plurality of emission locations in a focal plane of the first emission lens, wherein each of the first plurality of laser pulses is emitted at a respective one of the first plurality of emission locations, resulting in a corresponding one of the first plurality of incidence angles after being collimated by the first emission lens;
the first photodetector is configured to be translated through a first plurality of corresponding detection locations in a focal plane of the first receiving lens, wherein translation of the first photodetector is performed synchronously with translation of the first laser source such that a location of the first photodetector is always conjugate with a location of the first laser source at any given time;
the second laser source is configured to be translated through a second plurality of emission locations in a focal plane of the second emission lens, wherein each of the second plurality of laser pulses is emitted at a respective one of the second plurality of emission locations, resulting in a corresponding one of the second plurality of incidence angles after being collimated by the second emission lens; and
the second photodetector is configured to be translated through a second plurality of corresponding detection locations in a focal plane of the second receiving lens, wherein translation of the second photodetector is performed synchronously with translation of the second laser source such that a location of the second photodetector is always conjugate with a location of the second laser source at any given time.

8. A three-dimensional imaging system comprising:
a first three-dimensional sensor having a first optical axis oriented at a first angle toward a scene, the first three-dimensional sensor including:
a laser source configured to emit a plurality of laser pulses;
an emission optical element configured to collimate and direct the plurality of laser pulses at a plurality of corresponding incidence angles with respect to the first optical axis toward one or more first objects in the scene, wherein the plurality of corresponding incidence angles forms a first angular field of view of the first three-dimensional sensor, and wherein a portion of each of the plurality of laser pulses is reflected off of the one or more first objects;
a receiving optical element configured to receive and focus the portion of each of the plurality of laser pulses reflected off of the one or more first objects;
a photodetector configured to receive and detect the portion of each of the plurality of laser pulses focused by the receiving optical element; and
a processor including one or more processing units coupled to the laser source and the photodetector and configured to:
determine a time of flight for each of the plurality of laser pulses; and
construct a three dimensional image of the one or more first objects based on the determined time of flight for each of the plurality of laser pulses, the first angle of the first optical axis, and the plurality of incidence angles; and
a second three-dimensional sensor having a second optical axis oriented at a second angle toward the scene, the second three-dimensional sensor configured to construct a three-dimensional image of one or more second objects in the scene, the second three-dimensional sensor characterized by a second angular field of view that at least partially overlaps with the first angular field of view of the first three-dimensional sensor;
wherein the processor is coupled to the second three-dimensional sensor and configured to construct a three-dimensional image of the scene based on the three-dimensional image of the one or more first objects and the three-dimensional image of the one or more second objects.

9. The three-dimensional imaging system of claim 8 wherein:
the laser source is configured to be translated through a plurality of emission locations in a focal plane of the emission optical element, wherein each of the plurality of laser pulses is emitted at a respective one of the plurality of emission locations, resulting in a corresponding one of the plurality of incidence angles after being collimated by the emission optical element; and
the photodetector is configured to be translated through a plurality of corresponding detection locations in a focal plane of the receiving optical element, wherein translation of the photodetector is performed synchronously with translation of the laser source such that a location of the photodetector is always conjugate with a location of the laser source at any given time.

10. The three-dimensional imaging system of claim 8 wherein the first three-dimensional sensor and the second three-dimensional sensor are configured to construct a first three-dimensional image and a second three-dimensional image, respectively, of a third object positioned within an angular field of view where the first angular field of view and the second angular field of view overlap, and wherein the processor is configured to calibrate distance information determined by the second three-dimensional sensor based on the first three-dimensional image and the second three-dimensional image of the third object.

11. The three-dimensional imaging system of claim 8 wherein the first three-dimensional sensor and the second three-dimensional sensor are configured to construct a first three-dimensional image and a second three-dimensional image, respectively, of a third object positioned within an angular field of view where the first angular field of view and the second angular field of view overlap, and wherein the processor is configured to calibrate angular information determined by the second three-dimensional sensor based on the first three-dimensional image and the second three-dimensional image of the third object.

12. The three-dimensional imaging system of claim 11 wherein the angular information includes angular information in a first plane.

13. The three-dimensional imaging system of claim 12 wherein the angular information further includes angular information in a second plane orthogonal to the first plane.

14. The three-dimensional imaging system of claim 8 wherein the second three-dimensional sensor comprises a lidar sensor.

15. The three-dimensional imaging system of claim 8 wherein the second angular field of view encompasses the first angular field of view.

16. A method of three-dimensional sensing for an autonomous vehicle, the method comprising:
   sensing one or more first objects in a forward direction using a lidar sensor including a laser source, a photodetector, an emission optical element, a receiving optical element, and a processor including one or more processing units coupled to the laser source and the photodetector, by:
      emitting, using the laser source, a plurality of laser pulses;
      collimating and directing, using the emission optical element, the plurality of laser pulses at a plurality of corresponding incidence angles with respect to the forward direction toward the one or more first objects, wherein the plurality of corresponding incidence angles forms a first angular field of view of the lidar sensor, and wherein a portion of each of the plurality of laser pulses is reflected off of the one or more first objects;
      receiving and focusing, using the receiving optical element, the portion of each of the plurality of laser pulses reflected off of the one or more first objects;
      detecting, using the photodetector, the portion of each of the plurality of laser pulses focused by the receiving optical element;
      determining, using the processor, a time of flight for each of the plurality of laser pulses from emission to detection; and
      constructing, using the processor, a three dimensional image of the one or more first objects based on the determined time of flight for each of the plurality of laser pulses and the plurality of incidence angles;
   sensing one or more second objects in a left direction or a right direction using an optical three-dimensional sensor to obtain a three-dimensional image of the one or more second objects, the optical three-dimensional sensor being characterized by a second angular field of view that least partially overlaps with the first angular field of view of the lidar sensor; and
   combining, using the processor, the three dimensional image of the one or more first objects and the three-dimensional image of the one or more second objects.

17. The method of claim 16 wherein the second angular field of view of the optical three-dimensional sensor is wider than the first angular field of view of the lidar sensor.

18. The method of claim 17 wherein the lidar sensor has a first sensing range, and the optical three-dimensional sensor has a second sensing range less than the first sensing range.

19. The method of claim 16 further comprising:
   sensing a third object using the lidar sensor to obtain a first three-dimensional image of the third object, the third object positioned within an angular field of view where the first angular field of view and the second angular field of view overlap;
   sensing the third object using the optical three-dimensional sensor to obtain a second three-dimensional image of the third object; and
   calibrating, using the processor, distance information determined by the optical three-dimensional sensor based on the first three-dimensional image and the second three-dimensional image of the third object.

20. The method of claim 16 further comprising:
   sensing a third object using the lidar sensor to obtain a first three-dimensional image of the third object, the third object positioned within an angular field of view where the first angular field of view and the second angular field of view overlap;
   sensing the third object using the optical three-dimensional sensor to obtain a second three-dimensional image of the third object; and
   calibrating, using the processor, angular information determined by the optical three-dimensional sensor based on the first three-dimensional image and the second three-dimensional image of the third object.

21. The method of claim 16 further comprising:
   sensing a third object using the lidar sensor to obtain a first three-dimensional image of the third object, the third object positioned within an angular field of view where the first angular field of view and the second angular field of view overlap;
   sensing the third object using the optical three-dimensional sensor to obtain a second three-dimensional image of the third object; and
   calibrating, using the processor, angular information determined by the lidar sensor based on the first three-dimensional image and the second three-dimensional image of the third object.

* * * * *